US006253426B1

United States Patent
Miller et al.

(10) Patent No.: US 6,253,426 B1
(45) Date of Patent: Jul. 3, 2001

(54) VEHICLE RADIATOR LEAK REPAIR METHOD AND APPARATUS

(76) Inventors: Charles Miller; Roger Miller, both of 11176 41st Ct. N., Royal Palm Beach, FL (US) 33411

( * ) Notice: Subject to any disclaimer, the term of this patent is extended or adjusted under 35 U.S.C. 154(b) by 0 days.

(21) Appl. No.: 09/405,646

(22) Filed: Sep. 24, 1999

(51) Int. Cl.$^7$ .................................................. B23P 6/00
(52) U.S. Cl. .............................. 24/525; 24/535; 24/556; 29/890.031
(58) Field of Search ................................ 269/224, 254 R, 269/221, 219, 249; 24/525, 569, 535, 564, 571, 561, 562, 556, 555, 521, 507; 165/76; 29/890.031, 402.01

(56) References Cited

U.S. PATENT DOCUMENTS

| | | |
|---|---|---|
| 26,266 * | 11/1859 | Gray, Jr. . |
| 490,806 * | 1/1893 | Gulick . |
| 770,670 | 9/1904 | Brorby . |
| 800,441 * | 9/1905 | Herr et al. . |
| 1,185,956 * | 6/1916 | Supplee . |
| 1,298,919 * | 4/1919 | Erickson . |
| 1,586,061 * | 5/1926 | Barton . |
| 2,734,410 * | 2/1956 | Gipperich . |
| 3,241,352 * | 3/1966 | Lincourt . |
| 4,718,266 * | 1/1988 | Jarman et al. . |
| 5,004,045 | 4/1991 | Le Gauyer . |
| 5,297,482 * | 3/1994 | Cleveland . |
| 5,312,097 * | 5/1994 | Womack . |
| 5,586,373 * | 12/1996 | Eby et al. . |

FOREIGN PATENT DOCUMENTS

| | | | |
|---|---|---|---|
| 399623 * | 7/1909 | (FR) | 24/535 |
| 24675 * | of 1909 | (GB) | 24/535 |
| 253884 * | 2/1927 | (GB) | 24/535 |

* cited by examiner

Primary Examiner—James R. Brittain
(74) Attorney, Agent, or Firm—Alvin S. Blum

(57) ABSTRACT

Many automotive radiators are now made with a metallic heat exchanger core and plastic top and bottom portions. A circumferencial lip on the plastic portions receives an O-ring. A flange on the core is folded over the lip and crimped to compress the O-ring between the lip and the flange to achieve a seal. When the crimp loosens, the radiator leaks. Current practice is to remove and replace the radiator since the leak cannot be repaired by brazing. The invention provides a clamp for slipping over the flange at the leak. Rotating one or more screw fasteners on the clamp compresses the crimped portion of the flange at the leak and the O-ring to repair the leak. The clamp remains in place without significant interference with function. The method of repair may be employed without removing the radiator from the vehicle. In may be performed without special skills or tools to greatly reduce the costs of leak repair.

8 Claims, 2 Drawing Sheets

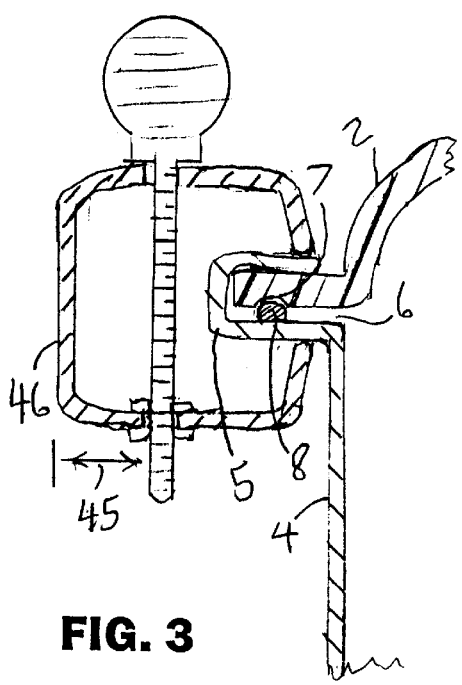
FIG. 3
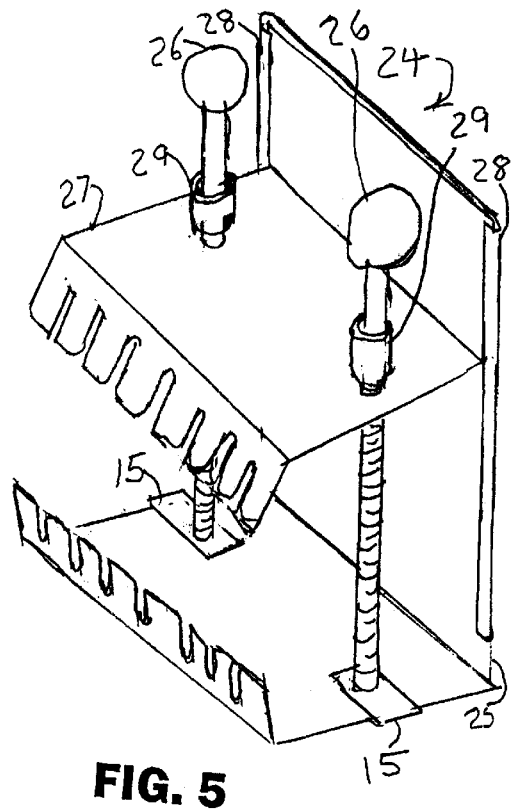
FIG. 5
FIG. 6
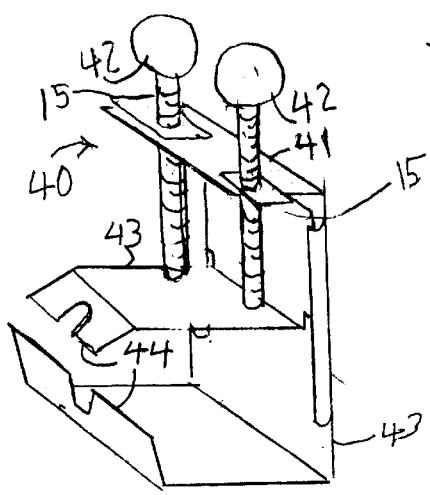
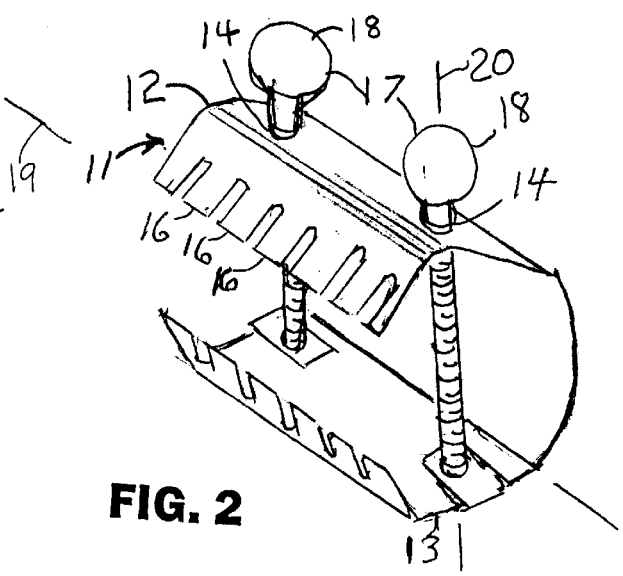
FIG. 2

VEHICLE RADIATOR LEAK REPAIR METHOD AND APPARATUS

BACKGROUND OF THE INVENTION

This invention relates to motor vehicle radiators and methods and apparatus for repairing them when they leak.

DESCRIPTION OF THE PRIOR ART

Vehicular radiators of the prior art were made entirely of metal with the various components welded, brazed, or soldered together. When they developed a leak, they were repaired by brazing the leak closed. U.S. Pat. No. 5,004,045 issued Apr. 2, 1991 to Gauyer discloses a method of clamping and brazing automotive radiators with a clamping fixture. The method is not applicable to many modem vehicular radiators that have plastic top and bottom portions that are sealed to a metallic heat exchanger core. The core portion has top and bottom flanges that mate with flanges on the plastic top and bottom portions. Interposed therebetween is a resilient gasket or O ring. The metal flanges are folded over the plastic flanges and crimped to compress the sealing gasket or O ring. It is common for the crimp to loosen enough to leak after a period of use. This generally results in the replacement of the entire radiator. The cost of the new radiator, the labor costs of replacement, and the loss of vehicle use are a real hardship. It would be useful to provide apparatus and method that could overcome most of these losses.

SUMMARY OF THE INVENTION

It is accordingly an object of the invention to provide a method and apparatus that will enable the leak to be sealed without removing the radiator and without requiring great skills or special tools. The apparatus of the invention comprises a special clamp that fits over the crimped portion of the flange that is leaking. Closing the clamp compresses the O ring between the metal and plastic flanges where the crimp had loosened and restores the seal. The clamp is left in place. The method can generally be applied without removing the radiator. In some cases some shrouds may limit access. They may be cut away or bent aside without serious degradation of function. The method may be applied by the vehicle owner or the mechanic without special training or tools. The clamp of the invention may provide screws operable by a standard screwdriver or thumbscrews that require no tools.

These and other objects, advantages, and features of the invention will become evident when the detailed description is studied in conjunction with the drawings, in which like elements are indicated by like reference characters.

BRIEF DESCRIPTION OF THE DRAWINGS

FIG. 2 is a perspective view of a clamp of the invention.

FIG. 3 is a partial sectional view taken through line 3—3 of FIG. 1 with a clamp of the invention in place to stop a leak.

FIG. 5 is a perspective view of another embodiment of the clamp of the invention.

FIG. 6 is a perspective view of another embodiment of the clamp of the invention.

DETAILED DESCRIPTION OF PREFERRED EMBODIMENTS

Figure 1:
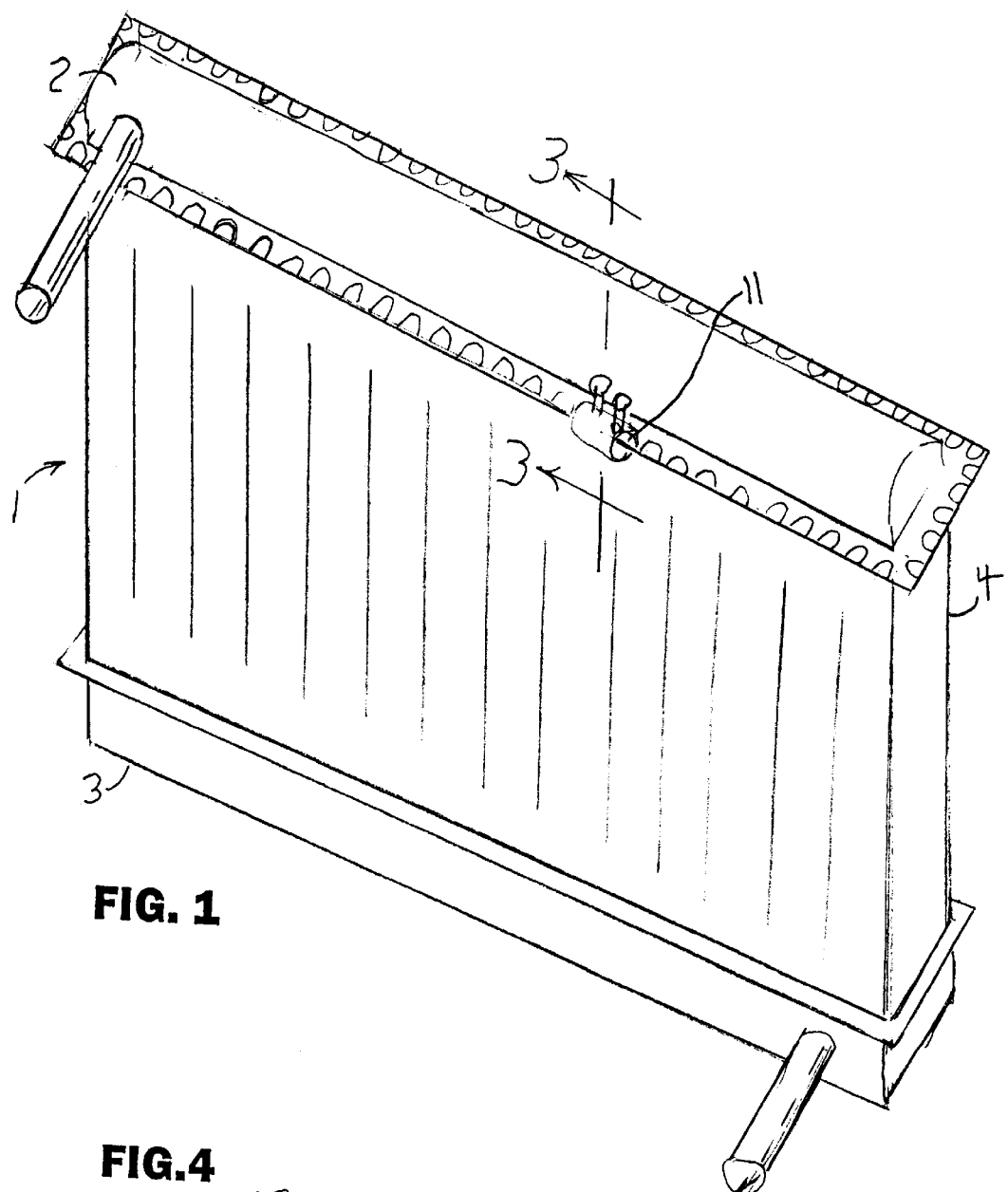
FIG. 1 is a perspective view of a radiator that has been repaired by the invention.
Figure 4:
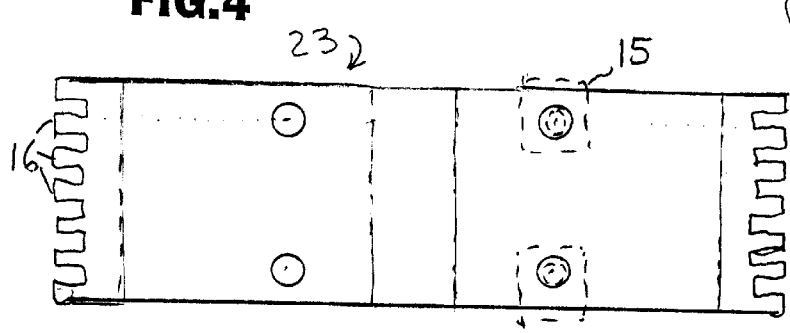
FIG. 4 is a plan view of the metal strip prior to bending to form the clamp of FIG. 2.

Referring now first to FIGS. 1–4, a conventional automotive radiator 1 of the type having a metallic heat exchanging core 4 and non-metallic (generally plastic) top portion 2 and bottom portion 3 is shown. The plastic portions have circumferential lips 6 with a groove 7. The core is provided with flanges 5. A resilient seal 8, generally an O-ring, is received in groove 7. The flange is then folded over the lip and crimped to squeeze the O-ring tightly between the lip and the flange to provide a secure liquid-tight seal therebetween. The severe thermal and pressure stresses to which this joint is subjected may force the crimp partly open, resulting in a leak. When this occurs, it is common current practice to replace the radiator, because the leak cannot be repaired by current radiator shop practice of brazing. The cost of the radiator and the labor costs of removing and replacing the radiator are considerable. Furthermore, the owner loses the use of the vehicle during the repair process. Applicants have discovered that the leak may be repaired by crimping the joint closed again using a unique and low cost clamp. Because the flange by itself has not been strong enough to keep the joint closed, it is important to leave the clamp in place. For this reason the design of the clamp must be such that it does not significantly interfere with the radiator function and is cheap enough to be expendable. To reduce labor costs associated with the repair process, the clamp is designed to be applicable while the radiator is still mounted in place in the vehicle. There is little room in the area of the radiator for manipulations and maneuvering tools. The clamps have been so designed that they may be readily installed without special tools or skills within the confines of the under-hood environment. The clamp 11 has a first jaw member 12 and an opposed second jaw member 13. Each jaw member is povided with a plurality of terminal projections 16 extending along a first axis 19 a distance of at least 2 centimeters to enable the projections to engage the flange at the leak 22 and on both sides thereof. A pair of screw fasteners 17 pass through apertures 14 in first jaw member 12 and threadedly engage second jaw member 13. The threaded engagement may involve threads cut in the metal of the jaw, a speednut 15 as shown, or other thread means well known in the art. The head 18 of the fastener may be of various configurations well known in the art. A thumb screw type is shown that may be turned without tools to draw the jaws together. In addition, the head of the second fastener may be used to hold the clamp in place while manipulating the first fastener. Each fastener extends along an axis 20 that is orthogonal to the first axis 19. The fasteners are disposed sufficiently far from the terminal projections that they permit the projections to engage the flange at or beyond the 0-ring, so as to effectively compress the seal. The distance 45, between the back of the clamp 46 and the fastener must be kept to a minimum to not interfere with other items adjacent to the radiator. Although two fasteners are shown, there may be one, or more than two. The clamp may be economically stamped from a single strip of metal 23 as shown in FIG. 4, and then bent into the shape as shown.

Referring now to FIG. 5, another embodiment of the invention is shown, in which the clamp 24 is formed from two metal strips. A separate movable jaw member 27 is slidingly mounted to an elongate jaw member 25, sliding in channels 28 formed by bending over the sides of member 25. Collars 29 swaged on fasteners 26 engage the top of the jaw 27. One or more long screw fasteners 26 draw the two jaws together.

Referring now to FIG. 6, another embodiment 40 of the clamp of the invention is shown that is similar to that of FIG. 5, with the exception that an upper flange portion 41 of the stationary jaw member 43 carries the speednuts 15 that threadedly receive the elongate thumbscrews 42. When these are rotated, they impinge upon the movable jaw member 43 and force it toward the lower portion of jaw member 41 to compress the radiator flange between the opposing projections 44.

METHOD

The method of the invention for repairing a leak in a radiator that has a metallic core with a terminal flange sealed to a non-metallic portion that has a circumferencial lip, with a resilient seal between the lip and the flange, and the flange folded over and crimped on the lip to compress the seal, and in which the leak develops at the resilient seal comprises:

a) providing a clamp having:

opposed first and second jaw members, each jaw member having a plurality of terminal projections extending along a first axis for engaging the flange along an extended length thereof that includes the leak area; at least one screw fastener means extending in a direction orthogonal to the first axis, and theadedly engaging one of the jaw members for drawing the jaw members toward one another by rotation of the fastener means; the terminal projections extending beyond the at least one fastener means sufficiently to enable the terminal projections to engage the opposed sides of the flange at or beyond the resilient seal;

b) disposing the clamp on the flange so that the terminal projections are on opposite sides of the flange and the projections extend along a length of the flange that includes the leak area; and c) rotating the at least one fastener means so as to draw the jaw members toward one another to cause the projections to forcefully engage opposite sides of the flange to further compress the resilient seal and stop the leak.

The above disclosed invention has a number of particular features which should preferably be employed in combination, although each is useful separately without departure from the scope of the invention. While I have shown and described the preferred embodiments of my invention, it will be understood that the invention may be embodied otherwise than herein specifically illustrated or described, and that certain changes in form and arrangement of parts and the specific manner of practicing the invention may be made within the underlying idea or principles of the invention.

What is claimed is:

1. A clamp for repairing a leak in a radiator that has a metallic core with a terminal flange sealed to a non-metailic portion that has a circumferential lip, with a resilient seal between the lip and the flange, and the flange folded over and crimped on the lip to compress the seal, and in which the leak develops at the resilient seal, the clamp comprising:

a) a substantially rectangular, metal sheet having two opposed first edges, each of the first edges provided with a series of cuts orthogonal to the edge that thereby generate a plurality of teeth or terminal projections, the sheet being folded into a clamp shape by;

i) two spaced-apart first folds parallel to the first edges to thereby define a back portion therebetween;

ii) two spaced-apart second folds parallel to the first edges, each second fold positioned between a first fold and one of the first edges, to thereby provide a planar jaw portion defined by each second fold and each first edge, the jaw portions opposing the back portion and to also thereby provide a pair of opposed spaced-apart intermediate portions between the first and second folds that are substantially orthogonal to the back portion and the jaw portions;

b) at least one screw fastener means operatively connecting the intermediate portions and disposed in a direction orthogonal to the folds for drawing the jaw portions toward one another by rotation of the fastener means, the terminal projections disposed beyond the at least one fastener means a first distance that is sufficient to enable the terminal projections to engage the opposed sides of the flange at or beyond the resilient seal, when the clamp is positioned on the flange, and the terminal projections extending along the first edges a distance of at least 2 centimeters; and c) the at least one screw fastener means being spaced apart from the back portion by a distance less than the first distance to thereby enable the clamp to be positioned on the flange while the radiator is in position in the vehicle.

2. The clamp according to claim 1, in which the at least one screw fastener means passes through a first intermediate portion and threadedly engages a second intermediate portion.

3. The clamp according to claim 2, in which there are two screw fastener means spaced apart from one another along an axis parallel to the first edges.

4. A clamp for repairing a leak in a radiator that has a metallic core with a terminal flange sealed to a non-metallic portion that has a circumferential lip, with a resilient seal between the lip and the flange, and the flange folded over and crimped on the lip to compress the seal, and in which the leak develops at the resilient seal, the clamp comprising:

a) a metal back portion;

b) a first intermediate metal portion extending substantially orthogonally from the back portion;

c) a second intermediate metal portion extending substantially orthogonally from the back portion spaced apart from, below, and parallel to, the first intermediate portion;

d) a first planar metal jaw portion extending downwardly from the first intermediate portion at an end remote from the back portion;

e) a second planar metal jaw portion extending upwardly from the second intermediate portion at an end remote from the back portion;

f) each jaw portion having a free edge provided with a plurality of cuts orthogonal to the free edge to thereby define a plurality of teeth or terminal projections, the free edges facing one another;

g) at least one screw fastener means operatively connecting the intermediate portions and disposed in a direction orthogonal to the free edges for drawing the jaw portions toward one another by rotation of the fastener means, the terminal projections disposed beyond the at least one fastener means a first distance that is sufficient to enable the terminal projections to engage the opposed sides of the flange at or beyond the resilient seal, when the clamp is positioned on the flange, and the terminal projections extending along the first edges a distance of at least 2 centimeters; and h) the at least one screw fastener means being spaced apart from the back portion by a distance less than the first distance to thereby enable the clamp to be positioned on the flange while the radiator is in position in the vehicle.

5. The clamp according to claim 4, in which the at least one screw fastener means passes through a first intermediate portion and threadedly engages a second intermediate portion.

6. The clamp according to claim 4, in which the clamp is formed from a single piece of metal, and rotation of the fastener means bends the metal, forcing the jaw portions toward one another.

7. The clamp according to claim 4, in which the second jaw portion is slidably connected to the first jaw portion for translatory motion therebetween.

8. A method of repairing a leak in a radiator that has a metallic core with a terminal flange sealed to a non-metallic portion that has a circumferential lip, with a resilient seal between the lip and the flange, and the flange folded over and crimped on the lip to compress the seal, and in which the leak develops at the resilient seal, the method comprising:

1) providing a clamp, the clamp comprising:

a) a metal back portion;

b) a first intermediate metal portion extending substantially orthogonally from the back portion;

c) a second intermediate metal portion extending substantially orthogonally from the back portion spaced apart from, below, and parallel to, the first intermediate portion;

d) a first planar metal jaw portion extending downwardly from the first intermediate portion at an end remote from the back portion;

e) a second planar metal jaw portion extending upwardly from the second intermediate portion at an end remote from the back portion;

f) each jaw portion having a free edge provided with a plurality of cuts orthogonal to the free edge to thereby define a plurality of teeth or terminal projections, the free edges facing one another;

g) at least one screw fastener means operatively connecting the intermediate portions and disposed in a direction orthogonal to the free edges for drawing the jaw portions toward one another by rotation of the fastener means, the terminal projections disposed beyond the at least one fastener means a first distance that is sufficient to enable the terminal projections to engage the opposed sides of the flange at or beyond the resilient seal, when the clamp is positioned on the flange, and the terminal projections extending along the first edges a distance of at least 2 centimeters; and h) the at least one screw fastener means being spaced apart from the back portion by a distance less than the first distance to thereby enable the clamp to be positioned on the flange while the radiator is in position in the vehicle;

2) disposing the clamp on the flange so that the terminal projections are on opposite sides of the flange and the projections extend along a length of the flange that includes the leak area; and 3) rotating the at least one fastener means so as to draw the jaw members toward one another to cause the projections to forcefully engage opposite sides of the flange to further compress the resilient seal and stop the leak.

* * * * *